US012007923B2

(12) United States Patent
Lee (10) Patent No.: US 12,007,923 B2
(45) Date of Patent: Jun. 11, 2024

(54) USB HUB DEVICE WITH MULTI-MODE PHYSICAL LAYER AND METHOD THEREOF

(71) Applicant: GENESYS LOGIC, INC., New Taipei (TW)

(72) Inventor: Wei-te Lee, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 4 days.

(21) Appl. No.: 17/958,458

(22) Filed: Oct. 3, 2022

(65) Prior Publication Data

US 2023/0118267 A1 Apr. 20, 2023

(30) Foreign Application Priority Data

Oct. 14, 2021 (TW) .................................. 110138231

(51) Int. Cl.
*G06F 13/362* (2006.01)
*G06F 13/38* (2006.01)
*G06F 13/40* (2006.01)

(52) U.S. Cl.
CPC .......... *G06F 13/362* (2013.01); *G06F 13/385* (2013.01); *G06F 13/4068* (2013.01)

(58) Field of Classification Search
None
See application file for complete search history.

(56) References Cited

U.S. PATENT DOCUMENTS

| 2006/0123182 | A1* | 6/2006 | Sandulescu | G06F 3/023 710/316 |
| 2015/0331826 | A1 | 11/2015 | Ghosh et al. | |
| 2017/0090543 | A1 | 3/2017 | Thielo | |
| 2019/0036365 | A1* | 1/2019 | Regupathy | H02J 7/00034 |
| 2019/0201047 | A1* | 7/2019 | Yates | A61B 18/1445 |
| 2019/0201073 | A1* | 7/2019 | Nott | A61B 18/14 |
| 2019/0236037 | A1* | 8/2019 | Sugumar | G06F 1/266 |

FOREIGN PATENT DOCUMENTS

CN  106415516 B  1/2020
TW  M615436 U  8/2021

* cited by examiner

*Primary Examiner* — Henry Tsai
*Assistant Examiner* — Aurangzeb Hassan
(74) *Attorney, Agent, or Firm* — Rivka Friedman (57) ABSTRACT

A universal serial bus (USB) hub with a multi-mode transmission physical layer and method thereof are provided. The hub includes a control unit and a hub controller. The hub controller is electrically connected to an upstream connection port, downstream port and the control unit for controlling a plurality of transmission modes of a differential signal to mitigate an issue of signal decay by the multi-mode transmission physical layer.

23 Claims, 6 Drawing Sheets

USB HUB DEVICE WITH MULTI-MODE PHYSICAL LAYER AND METHOD THEREOF

FIELD OF INVENTION

The present invention relates to a hub device, especially to a universal serial bus (USB) hub device with a multi-mode physical layer and a method thereof.

BACKGROUND OF INVENTION

With fast development of information technologies, electronic products are applied more and more popularly. For example, hand-held electronic devices such as notebooks, cell phones, and tablets are seen everywhere. Because these electronic devices are featured on portability and use anytime and anywhere, and for huge amounts of data transmission among various electronic devices, electronic devices usually are connected to downstream connection ports of a hub by a universal serial bus (USB) connection cable, and an upstream connection port of the hub is connected to a host device such that data transmitting and reception are implemented between the electronic devices and the host device through a USB transmission protocol of the hub.

For example, a universal serial bus (USB) Type-C connection port has a characteristic of consistent connection type of upper and lower ends of a connection port and is used extensively in data and image transmission and charging procedures among devices. However, a USB transmission interface of the C type easily causes signal attenuation when switching transmission channels of data and images to result in errors of data contents and poor image quality to lower quality of the hub device. As such, it is required to develop a novel hub device for solving the above issue.

SUMMARY OF INVENTION

One objective of the present invention is to provide a universal serial bus (USB) hub device with a multi-mode physical layer and a method thereof solving an issue of signal attenuation by the multi-mode physical layer to improve data transmission quality of the hub device.

To achieve the above objective, a hub device with a multi-mode physical layer of the present invention is adapted for a universal serial bus, the universal serial bus (USB) hub device with the multi-mode physical layer is adapted to be electrically connected a first electronic device and a second electronic device, and the universal serial bus hub device comprises: an upstream connection port electrically connected to the first electronic device and configured to transmit a differential signal of the first electronic device, wherein the upstream connection port comprises a configuration channel configured to transmit a setting message, the setting message is configured to indicate a connection state between the first electronic device and the second electronic device; a downstream connection port electrically connected to the second electronic device and configured to transmit the differential signal; a control unit electrically connected to the upstream connection port, wherein the control unit is configured to determine a transmission mode of the differential signal according to the setting message, and transmission mode comprises a first transmission mode and a second transmission mode; and a hub controller electrically connected to the upstream connection port, the downstream connection port and the control unit and configured to control the transmission mode of the differential signal, wherein the hub controller comprises:

at least one set of upstream physical layers electrically connected to the upstream connection port and configured to transmit the differential signal according to the transmission mode; at least one set of downstream physical layers electrically connected to the downstream connection port and configured to receive the differential signal according to the transmission mode; a hub control logic electrically connected to the at least one set of upstream physical layers and the at least one set of downstream physical layers and configured to implement the first transmission mode of the differential signal between the at least one set of upstream physical layers and the at least one set of downstream physical layers such that the differential signal is transmitted through the at least one set of downstream physical layers to the second electronic device; and a buffer electrically connected to the at least one set of upstream physical layers and the at least one set of downstream physical layers and configured to transmit the differential signal by the second transmission mode.

In an embodiment, the upstream connection port and the downstream connection port are C-type connection ports compatible with a USB protocol.

In an embodiment, a data content corresponding to the transmission mode is USB data, non-USB data, or a combination thereof, the USB data corresponding to the first transmission mode is defined as data compatible with a USB protocol, the non-USB data corresponding to the second transmission mode is defined as data compatible with a non-USB protocol.

In an embodiment, the non-USB data is display port (DP) data, mobile high definition link (MHL) data, peripheral component interconnect express (PCIE) data, or a combination thereof, the DP data is defined as data compatible with a DP protocol, the MHL data is defined as data compatible with a MHL protocol, and the PCIE data is defined as data compatible with a PCIE protocol.

In an embodiment, the at least one set of upstream physical layers comprises a first set of upstream physical layer and a second set of upstream physical layers, the first set of upstream physical layer is connected to the upstream connection port by a first transceiver channel, and the second set of upstream physical layers is connected to the upstream connection port through a second transceiver channel.

In an embodiment, the at least one set of downstream physical layers comprises a first set of downstream physical layers and a second set of downstream physical layers, the first set of downstream physical layers is connected to the downstream connection port through a third transceiver channel, and the second set of downstream physical layers is connected to the downstream connection port through a fourth transceiver channel.

In an embodiment, when the control unit determines the transmission mode in which the first transceiver channel transmits USB data and the second transceiver channel is not used, the hub controller controls the first set of upstream physical layers to transmit the USB data to the first set of downstream physical layers and the second set of downstream physical layers through the first transceiver channel.

In an embodiment, when the control unit determines the transmission mode in which the first transceiver channel is not used and the second transceiver channel transmits USB data, the hub controller controls the second set of upstream physical layer to transmit the USB data to the first set of downstream physical layers and the second set of downstream physical layers through the second transceiver channel.

In an embodiment, when the control unit determines the transmission mode in which the first transceiver channel transmits USB data and the second transceiver channel transmits non-USB data, the hub controller controls the first set of upstream physical layers to transmit the USB data to the first set of downstream physical layers through the first transceiver channel, and the hub controller controls the second set of upstream physical layer to transmit the non-USB data to the second set of downstream physical layers through the second transceiver channel.

In an embodiment, when the control unit determines the transmission mode in which the first transceiver channel transmits non-USB data and the second transceiver channel transmits USB data, the hub controller controls the first set of upstream physical layers to transmit the non-USB data to the first set of downstream physical layers through the first transceiver channel, and the hub controller controls the second set of upstream physical layer to transmit the USB data to the second set of downstream physical layers through the second transceiver channel.

In an embodiment, when the control unit determines the transmission mode in which the first transceiver channel transmits non-USB data and the second transceiver channel transmits non-USB data, the hub controller controls the first set of upstream physical layers to transmit the non-USB data to the first set of downstream physical layers through the first transceiver channel, and the hub controller controls the second set of upstream physical layer to transmit the non-USB data to the second set of downstream physical layers through the second transceiver channel.

In an embodiment, the control unit is a power delivery controller, the power delivery controller is electrically connected to a VBUS voltage pin defined by a USB interface of the upstream connection port.

In an embodiment, the control unit is connected to the hub controller by a system management bus (SMBUS).

The present invention discloses a method for a universal serial bus (USB) hub device with a multi-mode physical layer, wherein the universal serial bus (USB) hub device is electrically connected to a first electronic device and a second electronic device, and the method comprising steps as follows: transmitting a differential signal of the first electronic device by an upstream connection port, the upstream connection port comprises a configuration channel configured to transmit a setting message, wherein the setting message is configured to indicate a connection state between the first electronic device and the second electronic device; transmitting the differential signal by a downstream connection port; determining a transmission mode of the differential signal according to the setting message by a control unit, wherein the transmission mode comprises a first transmission mode and a second transmission mode; and controlling the transmission mode of the differential signal by a hub controller, which comprises steps as follows: transmitting the differential signal according to the transmission mode by at least one set of upstream physical layers; receiving the differential signal according to the transmission mode by at least one set of downstream physical layers; implementing the first transmission mode of the differential signal between the at least one set of upstream physical layers and the at least one set of downstream physical layers by a hub control logic such that the differential signal is transmitted to the second electronic device through the at least one set of downstream physical layers; and transmitting the differential signal according to the second transmission mode by a buffer.

In an embodiment of the method with the multi-mode physical layer, USB data corresponding to the first transmission mode is defined as data compatible with a USB protocol, and non-USB data corresponding to the second transmission mode is defined as data compatible with a non-USB protocol.

In an embodiment of the method with the multi-mode physical layer, the non-USB data is display port (DP) data, mobile high definition link (MHL) data, peripheral component interconnect express (PCIE) data, or a combination thereof, the DP data is defined as data compatible with a DP protocol, the MHL data is defined as data compatible with a MHL protocol, and the PCIE data is defined as data compatible with a PCIE protocol.

In an embodiment of the method with the multi-mode physical layer, before the step of by the control unit, determining the transmission mode of the differential signal according to the setting message, further comprises steps as follows: receiving a control signal to determine the at least one set of upstream physical layers to transmit USB data or non-USB data by the control unit; and electrically connecting the at least one set of upstream physical layers with the hub control logic when the at least one set of upstream physical layers transmits the USB data by the first transmission mode, and electrically connecting the at least one set of upstream physical layers with the buffer when the at least one set of upstream physical layers transmits the non-USB data by the second transmission mode.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

DETAILED DESCRIPTION OF PREFERRED EMBODIMENTS

With reference to figures, wherein the same element symbol represents the same element or similar element. A principle of the present invention is examples as indicated by embodiments in a suitable operation environment. The following description is based on specific exemplary embodiments of the present invention and should not be deemed as limits to other non-described specific embodiments not of the present invention.

Figure 1:
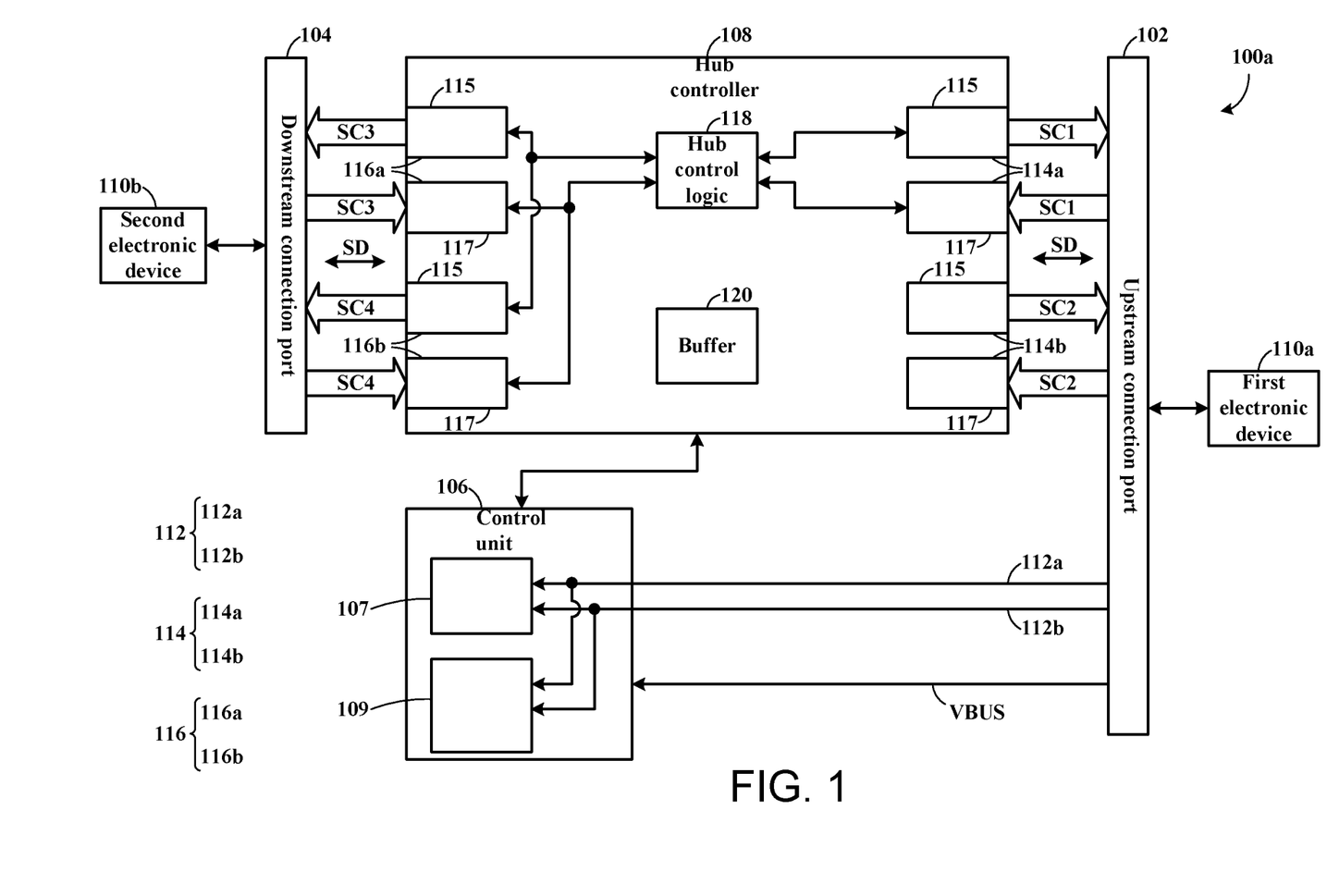
FIG. 1 depicts and illustrates a block diagram of a hub device with a multi-mode physical layer according to the embodiment of the present invention in a first state.

With reference to FIG. 1, FIG. 1 depicts and illustrates a block diagram of a hub device 100a with a multi-mode physical layer (PHY) according to the embodiment of the present invention in a first state. The hub device 100a comprises an upstream connection port 102, a downstream connection port 104, a control unit 106, and hub controller 108. The upstream connection port 102 is electrically connected to at least one first electronic device 110a. The downstream connection port 104 is electrically connected to at least one second electronic device 110b. The control unit 106 is electrically connected to the upstream connection port 102 and the hub controller 108. The hub controller 108 is electrically connected to the upstream connection port 102, the downstream connection port 104, and the control unit 106. In an embodiment, the upstream connection port 102 and the downstream connection port 104 is a C-type connection port compatible with a universal serial bus (USB) protocol. The USB hub device with the multi-mode physical layer of the present invention is adapted to be electrically connected to one first electronic device 110a and one second electronic device 110b.

With reference to FIG. 1, the upstream connection port 102 is configured to transmit a differential signal (SD) of the first electronic device 110a, and the upstream connection port 102 comprises a configuration channel 112 configured to transmit a setting message. The setting message is configured to indicate a connection state between the first electronic device 110a and the second electronic device 110b. In an embodiment, the configuration channel 112 is composed of first signals 112a and second signals 112b. The downstream connection port 104 is electrically connected to the second electronic device 110b and is configured to transmit the differential signal SD. In other words, the first electronic device 110a transmits the differential signal SD to the second electronic device 110b by controlling the control unit 106 and the hub controller 108.

In FIG. 1, the control unit 106 is configured to determine a transmission mode of the differential signal according to the setting message. The transmission mode comprises a first transmission mode and a second transmission mode. In an embodiment, control unit 106 determines the transmission mode of the differential signal SD by detecting the connection state between the upstream connection port 102 and the downstream connection port 104 according to the setting message of the configuration channel 112. For example, the control unit 106 detects levels of the first signal 112a and the second signal 112b, the first signal 112a at a pulldown level indicates that the upstream connection port 102 is inserted right. For example, the second signal 112b at a pulldown level indicates that the upstream connection port 102 is inserted invertedly. In other words, the control unit 106 determines the transmission mode of the differential signal SD according to the first signal 112a and the second signal 112b. In an embodiment, the control unit 106 is connected to the hub controller 108 by a system management bus (SMBUS). In an embodiment, the control unit 106 is a power delivery controller, the power delivery controller is electrically connected to a VBUS voltage pin defined by a USB interface protocol of the upstream connection port 102 and is configured to control the upstream connection port 102 to perform boost and buck processes of supplied power to the downstream connection port 104. In an embodiment, the control unit 106 comprises a configuration channel controller 107 and a bi-phase marker encoding/decoding controller 109. The bi-phase marker encoding/decoding controller 109 is connected to the configuration channel controller 107.

With reference to FIG. 1, the hub controller 108 is electrically connected to the upstream connection port 102, the downstream connection port 104 and the control unit 106 and is configured to control the transmission mode of the differential signal SD. The hub controller 108 comprises at least one set of upstream physical layers 114, at least one set of downstream physical layers 116, a hub control logic 118, and a buffer 120. The at least one set of upstream physical layers 114 is electrically connected to the upstream connection port 102, the hub control logic 118, and the buffer 120. The at least one set of downstream physical layers 116 is electrically connected to the downstream connection port 104, the hub control logic 118, and the buffer 120 and corresponds to the at least one set of upstream physical layers 114. The hub control logic 108 is electrically connected to the at least one set of upstream physical layers 114 and the at least one set of downstream physical layers 116. The buffer 120 is electrically connected to the at least one set of upstream physical layers 114 and the at least one set of downstream physical layers 116.

In FIG. 1, at least one set of upstream physical layers 114 is configured to transmit the differential signal SD from the upstream connection port 102 according to the transmission mode. The at least one set of downstream physical layers 116 is configured to receive the differential signal SD according to the transmission mode. The hub control logic 108 is configured to implement the first transmission mode of the differential signal SD between the at least one set of upstream physical layers 114 and the at least one set of downstream physical layers 116 such that the differential signal SD is transmitted to the second electronic device 110b through the at least one set of downstream physical layers 116. buffer 120 is configured to transmit the differential signal SD by the second transmission mode. A data content corresponding to the transmission mode is USB data, non-USB data, or a combination thereof, and the USB data is defined as data compatible with a USB protocol. The non-USB data is defined as data compatible with a non-USB protocol. The non-USB data is display port (DP) protocol data, mobile high-definition link (MHL) technology protocol data, peripheral component interconnect express (PCIE) interface protocol data, or a combination thereof. The DP data is defined as data compatible with a DP protocol. The MHL data is defined as data compatible with a MHL protocol, and the PCIE data is defined as data compatible with a PCIE protocol. In another embodiment, the non-USB data, for example, is image display data. In an embodiment, when the control unit 106 determines a transmission mode of the differential signal as the first transmission mode or the second transmission mode according to the setting message, the control unit 106 of the present invention receives a control signal to determine the at least one set of upstream physical layers 114 to transmit USB data or non-USB data. The at least one set of upstream physical layers 114, when transmitting the USB data by the first transmission mode, electrically connects the at least one set of upstream physical layers 114 to the hub control logic 118. The at least one set of upstream physical layers 114, when transmitting the non-USB data by the second transmission mode, electrically connects the at least one set of upstream physical layers 114 to the buffer 120.

As shown in FIG. 1, the at least one set of upstream physical layers 114 comprises a first set of upstream physical layer 114a and a second set of upstream physical layers 114b, the first set of upstream physical layer 114a is connected to the upstream connection port 102 through the first transceiver channel SC1, and the second set of upstream physical layers 114b is connected to the upstream connection port 102 through the second transceiver channel SC2. The at least one set of downstream physical layers 116 comprises a first set of downstream physical layers 116a and a second set of downstream physical layers 116b, the first set of downstream physical layer 116a is connected to the downstream connection port 104 through a third transceiver channel SC3, the second set of downstream physical layers 116b is connected to the downstream connection port 104 through a fourth transceiver channel SC4. The first set of upstream physical layer 114a comprises a transmission physical layer 115 and a reception physical layer 117. The second set of upstream physical layers 114b comprises a transmission physical layer 115 and a reception physical layer 117. The first set of downstream physical layers 116a comprises a transmission physical layer 115 and a reception physical layer 117. The second set of downstream physical layers 116b comprises a transmission physical layer 115 and a reception physical layer 117.

As shown in FIG. 1, when the control unit 106 determines the transmission mode in which the first transceiver channel SC1 transmits USB data and the second transceiver channel SC2 is not used, the hub controller 108 controls the first set of upstream physical layers 114a to transmit the USB data to the first set of downstream physical layers 116a and the second set of downstream physical layers 116b through the first transceiver channel SC1. With reference to FIG. 1, the first transceiver channel SC1 is in an enable state and the second transceiver channel SC2 is in a disable state, and the hub control logic 118 controls the first set of upstream physical layers 114a to transmit the USB data to the first set of downstream physical layers 116a and the second set of downstream physical layers 116b through the first transceiver channel SC1.

The hub device 100a of the present invention uses the upstream physical layer 114 to parse, amplify, and filter data contents corresponding to the differential signal SD to reduce an attenuation effect of the differential signal SD. In other words, the hub device 100a reorganizes and transmits the received differential signal SD to the downstream physical layer 116 such that the differential signal SD is transmitted from the first electronic device 110a to the second electronic device 110b under a circumstance of ensured signal quality, especially during transmission of the differential signal SD in a high frequency state, which can prevent attenuation of differential signal SD phenomenon to improve data transmission quality of the hub device 100a.

Figure 2:
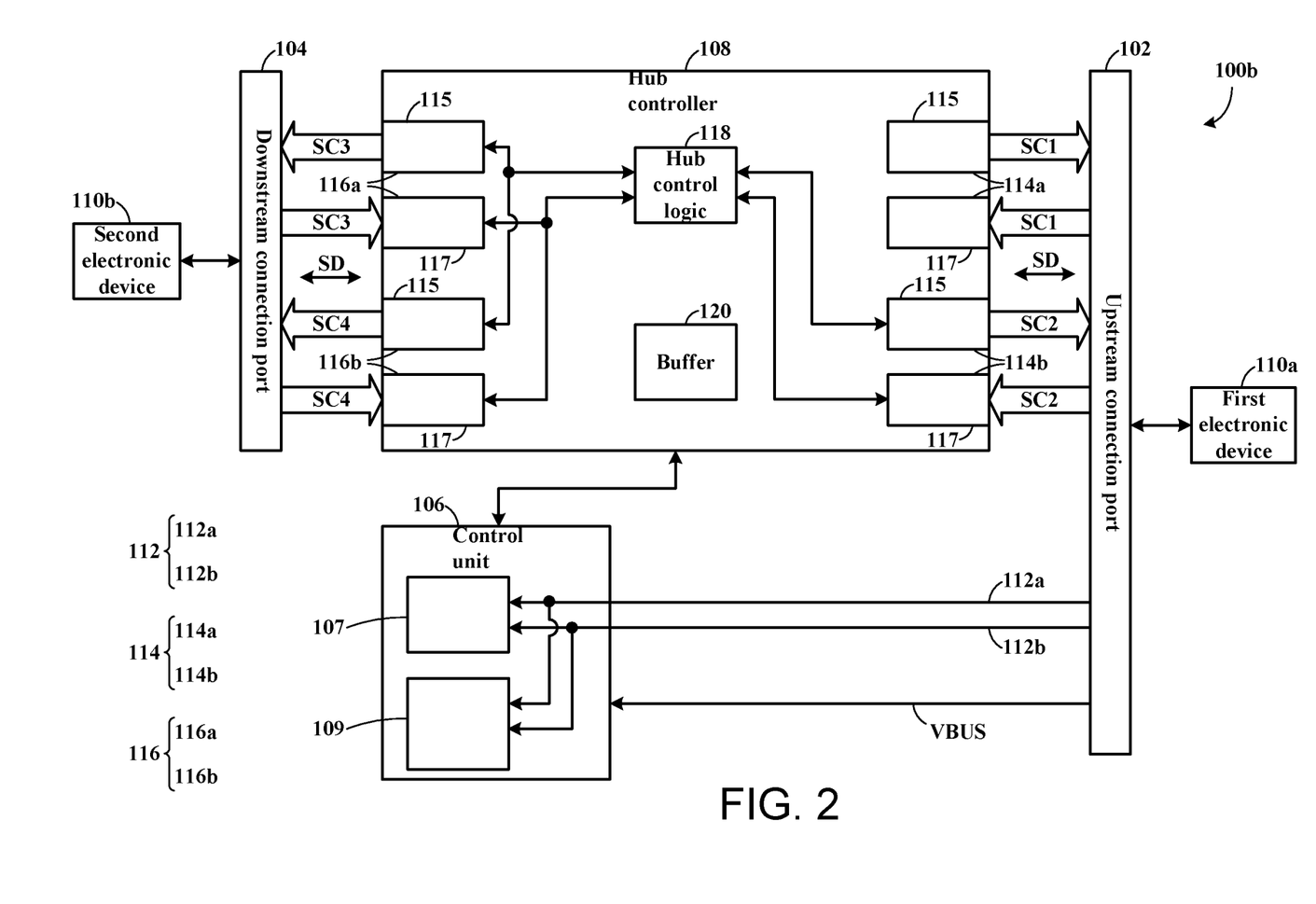
FIG. 2 depicts and illustrates a block diagram of the hub device with the multi-mode physical layer according to the embodiment of the present invention in a second state.

With reference to FIG. 2, FIG. 2 depicts and illustrates a block diagram of the hub device 100b with the multi-mode physical layer according to the embodiment of the present invention in a second state. When the control unit 106 determines the transmission mode in which the first transceiver channel SC1 is not used and the second transceiver channel SC2 transmits USB data, the hub controller 108 controls the second set of upstream physical layers 114b to transmit the USB data to the first set of downstream physical layers 116a and the second set of downstream physical layers 116b through the second transceiver channel SC2. With reference to FIG. 2, when the first transceiver channel SC1 is in the disable state and the second transceiver channel SC2 is in the enable state, the hub control logic 118 controls the second set of upstream physical layers 114b to transmit the USB data to the first set of downstream physical layers 116a and the second set of downstream physical layers 116b through the second transceiver channel SC2.

Figure 3:
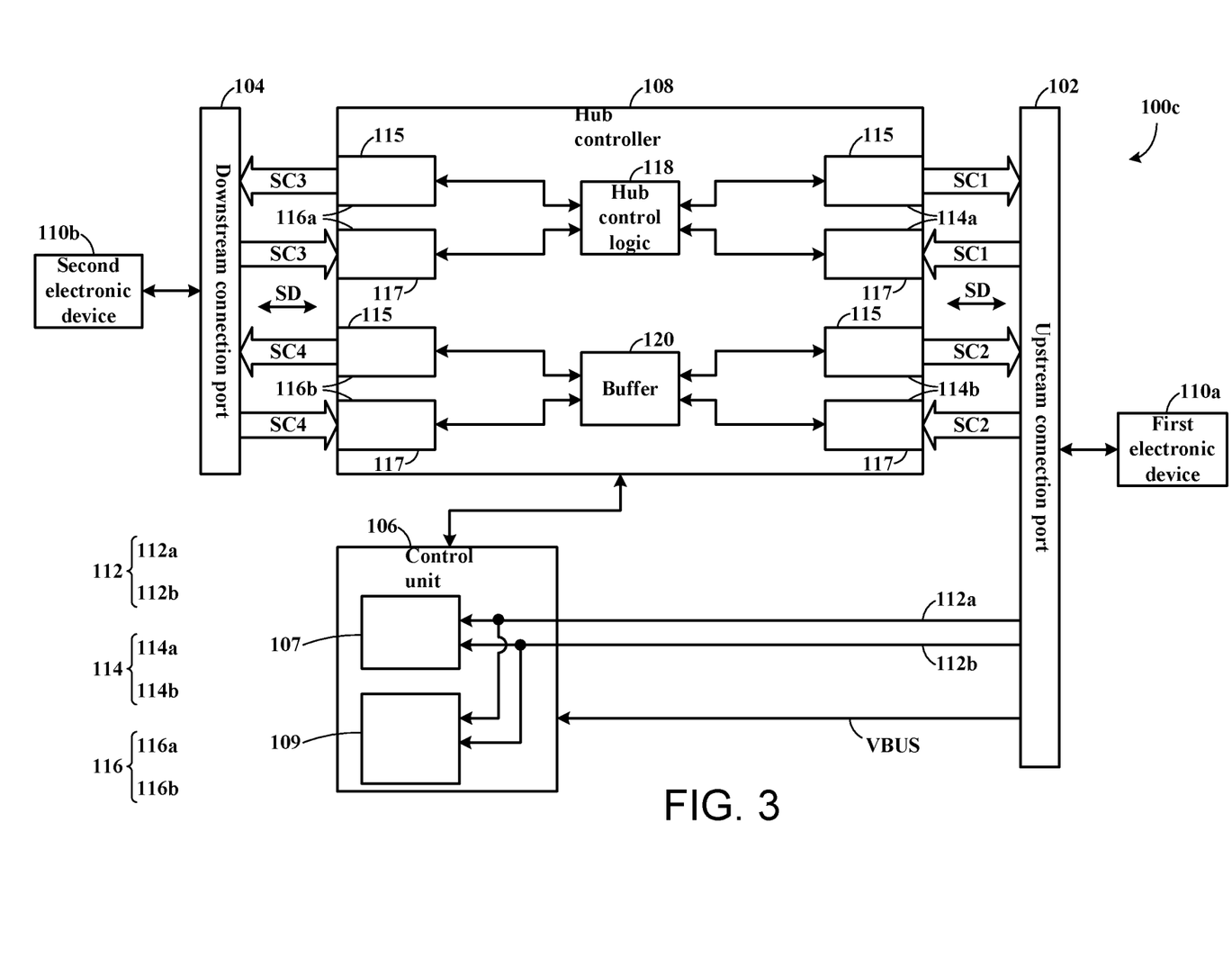
FIG. 3 depicts and illustrates a block diagram of the hub device with the multi-mode physical layer according to the embodiment of the present invention in a third state.

With reference to FIG. 3, FIG. 3 depicts and illustrates a block diagram of the hub device 100c with the multi-mode physical layer according to the embodiment of the present invention in a third state. When the control unit 106 determines the transmission mode in which the first transceiver channel SC1 transmits USB data and the second transceiver channel SC2 transmits non-USB data, the hub controller 108 controls the first set of upstream physical layers 114a to transmit the USB data to the first set of downstream physical layers 116a through the first transceiver channel SC1, and the hub controller 108 controls the second set of upstream physical layer 114b to transmit the non-USB data to the second set of downstream physical layers 116b through the second transceiver channel SC2. With reference to FIG. 3, when the first transceiver channel SC1 is in the enable state and the second transceiver channel SC2 is in the enable state, hub control logic 118 controls the first set of upstream physical layers 114a to transmit the USB data to the first set of downstream physical layers 116a through the first transceiver channel SC1, and the hub control logic 118 controls the second set of upstream physical layer 114b to transmit the non-USB data to the second set of downstream physical layers 116b through the second transceiver channel SC2.

Figure 4:
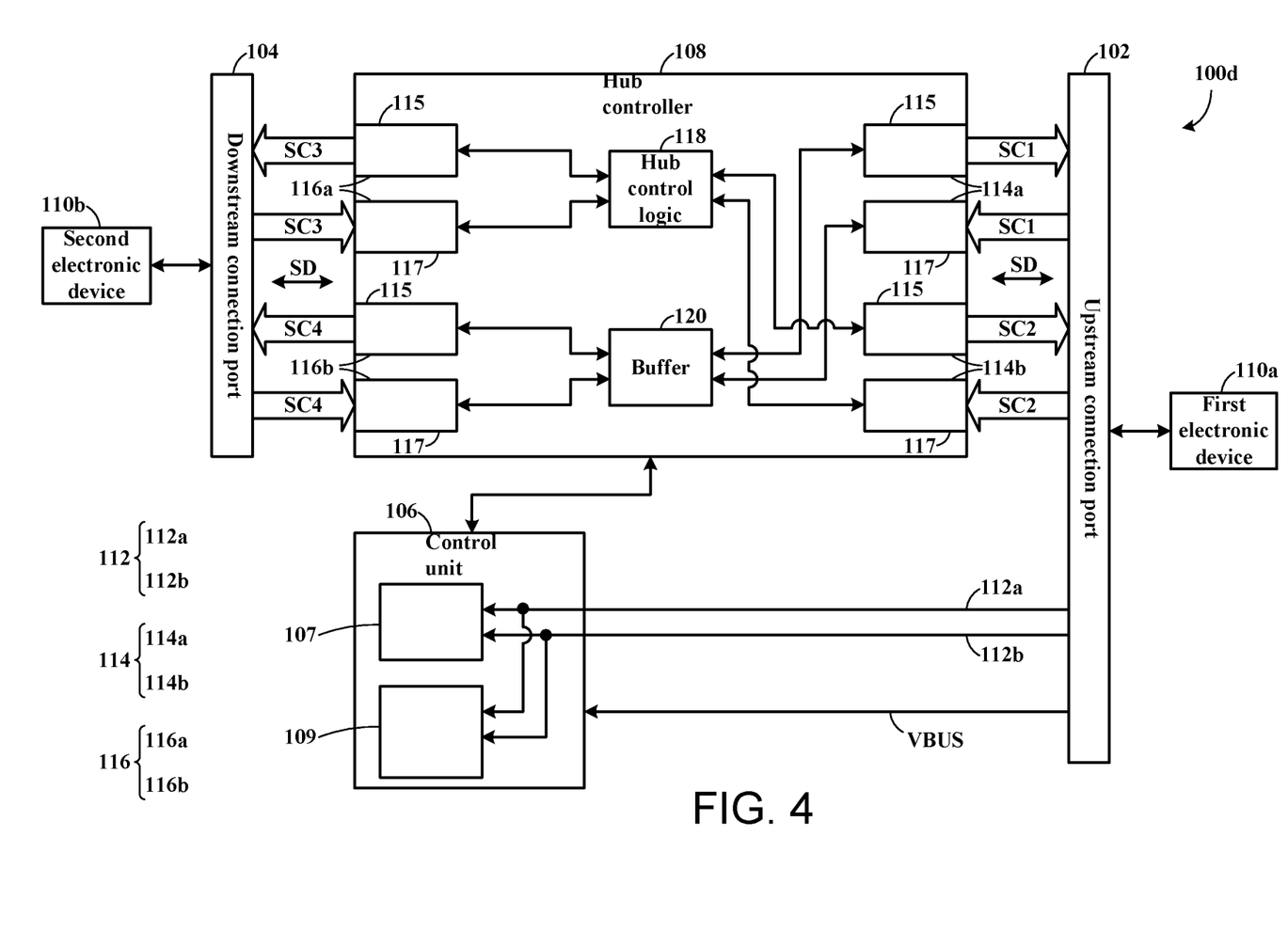
FIG. 4 depicts and illustrates a block diagram of the hub device with the multi-mode physical layer according to the embodiment of the present invention in a fourth state.

With reference to FIG. 4, FIG. 4 depicts and illustrates a block diagram of the hub device 100d with the multi-mode physical layer according to the embodiment of the present invention in a fourth state. When the control unit 106 determines the transmission mode in which the first transceiver channel SC1 transmits non-USB data and the second transceiver channel SC2 transmits USB data, the hub controller 108 controls the first set of upstream physical layers 114a to transmit the non-USB data to the first set of downstream physical layers 116a through the first transceiver channel SC1, and the hub controller 108 controls the second set of upstream physical layer 114b to transmit the USB data to the second set of downstream physical layers 116b through the second transceiver channel SC2. With reference to FIG. 4, the first transceiver channel SC1 is in the enable state and the second transceiver channel SC2 is in the enable state, the hub control logic 118 controls the first set of upstream physical layers 114a to transmit the non-USB data to the first set of downstream physical layers 116a through the first transceiver channel SC1, and the hub control logic 118 controls the second set of upstream physical layer 114b to transmit the USB data to the second set of downstream physical layers 116b through the second transceiver channel SC2.

Figure 5:
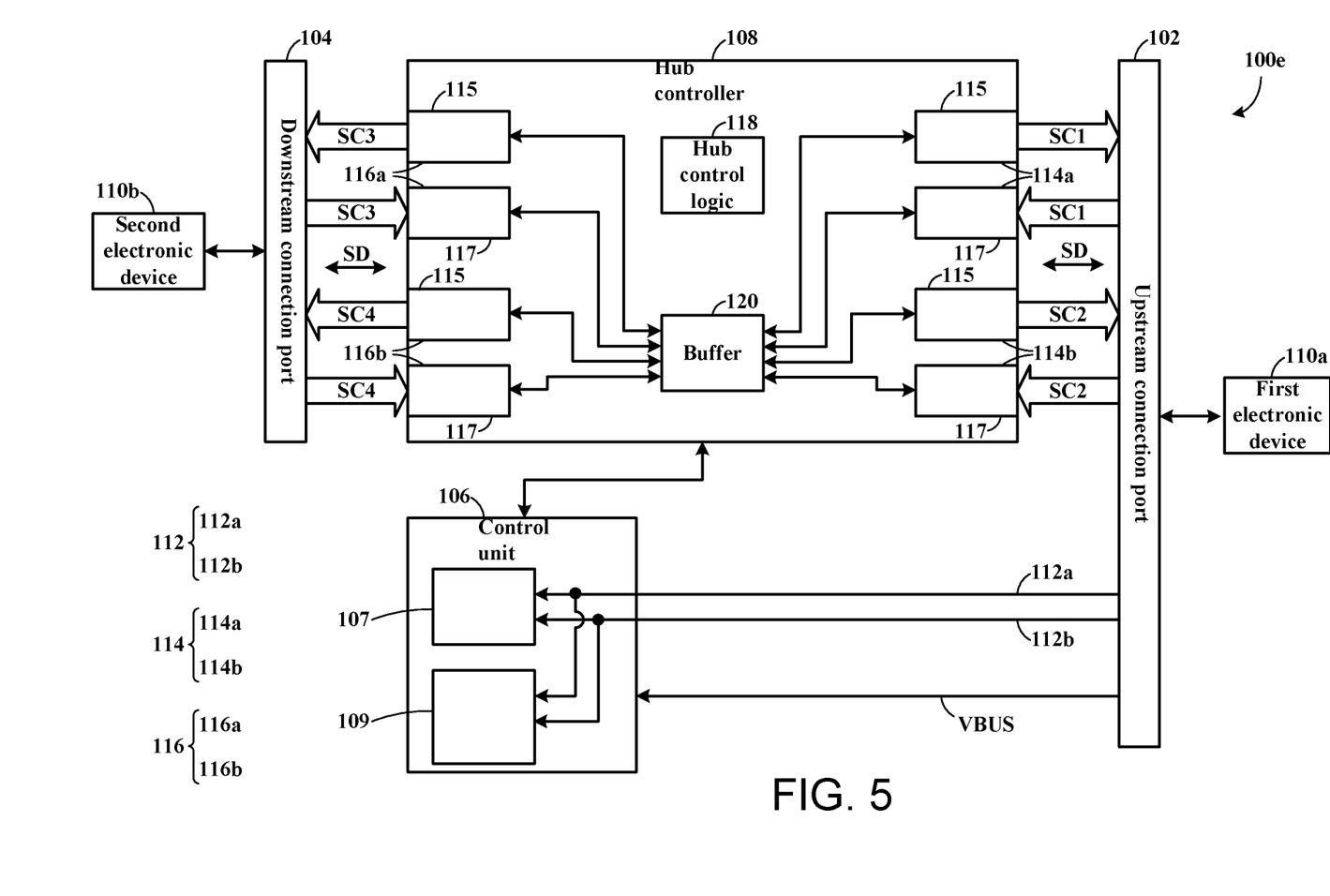
FIG. 5 depicts and illustrates a block diagram of the hub device with the multi-mode physical layer according to the embodiment of the present invention in a fifth state.

With reference to FIG. 5, FIG. 5 depicts and illustrates a block diagram of the hub device 100e with the multi-mode physical layer according to the embodiment of the present invention in a fifth state. When the control unit 106 determines the transmission mode in which the first transceiver channel SC1 transmits non-USB data and the second transceiver channel SC2 transmits non-USB data, the hub controller 108 controls the first set of upstream physical layers 114a to transmit the non-USB data to the first set of downstream physical layers 116a through the first transceiver channel SC1, and the hub controller 108 controls the second set of upstream physical layer 114b to transmit the non-USB data to the second set of downstream physical layers 116b through the second transceiver channel SC2. With reference to FIG. 5, the first transceiver channel SC1 is in the enable state and the second transceiver channel SC2 is in the enable state, the hub control logic 118 controls the first set of upstream physical layers 114a transmit the non-USB data to the first set of downstream physical layers 116a through the first transceiver channel SC1 to, and the hub control logic 118 controls the second set of upstream physical layer 114b to transmit the non-USB data to the second set of downstream physical layers 116b through the second transceiver channel SC2.

The hub device 100b, 100c, 100d, 100e of the present invention uses the upstream physical layer 114 to parse, amplify, and filter data contents corresponding to the differential signal SD to reduce an attenuation effect of the differential signal SD. In other words, the hub device 100b, 100c, 100d, 100e reorganizes and transmits the received differential signal SD to the downstream physical layer 116 such that the differential signal SD is transmitted from the first electronic device 110a to the second electronic device 110b under a circumstance of ensured signal quality, especially during transmission of the differential signal SD in a high frequency state, which can prevent attenuation of differential signal SD phenomenon to improve data transmission quality of the hub device 100b, 100c, 100d, 100e.

Figure 6:
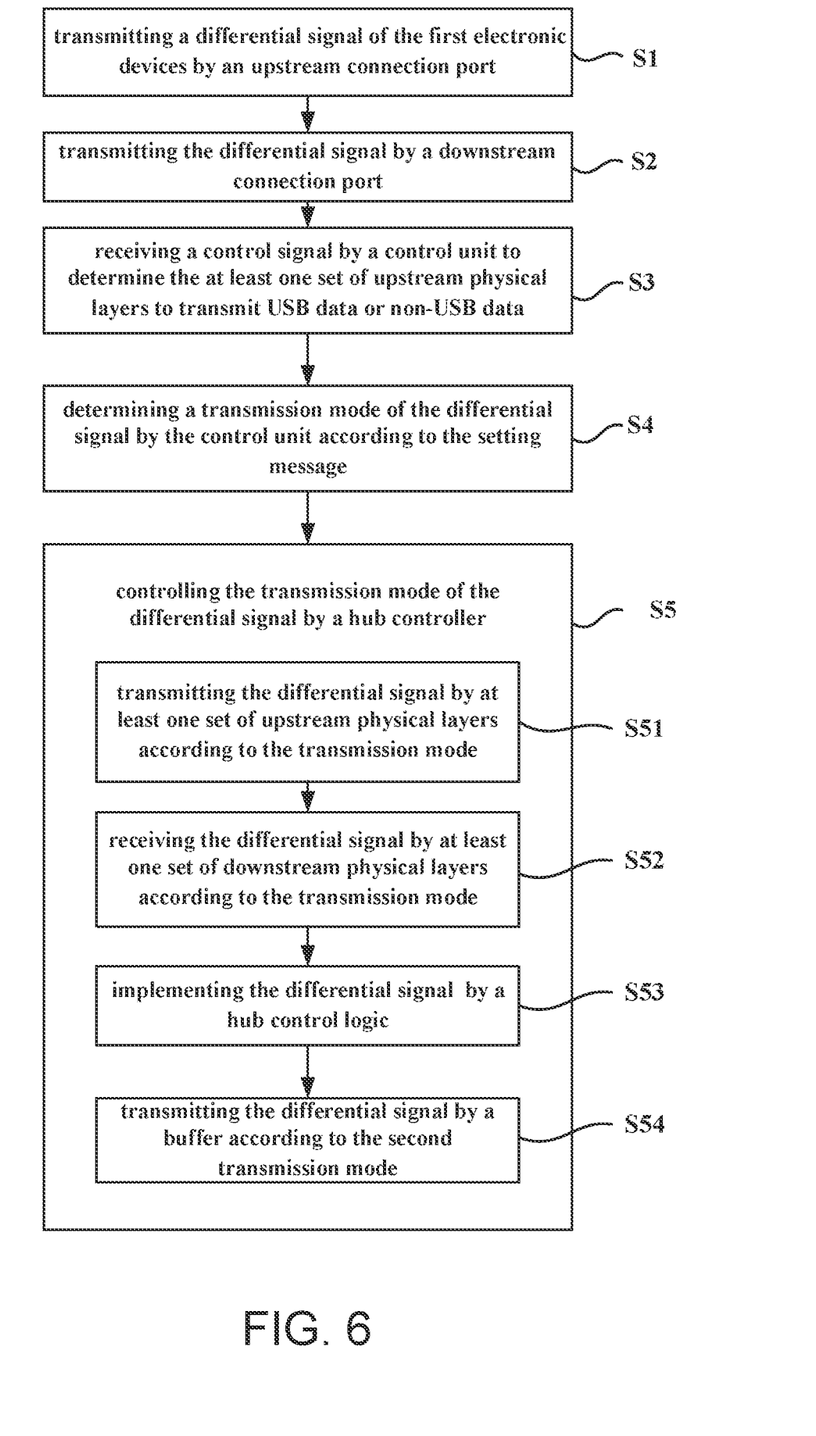
FIG. 6 depicts and illustrates a flowchart of a method with a multi-mode physical layer according to the embodiment of the present invention.

With reference to FIGS. 1 and 6, FIG. 6 depicts and illustrates a flowchart of a method with a multi-mode physical layer according to the embodiment of the present invention, the method with the multi-mode physical layer of the present invention is adapted for a universal serial bus (USB) hub device, and is adapted to be electrically connected to a first electronic device 110a and a second electronic device 110b. The method with the multi-mode physical layer comprises steps as follows:

The step S1 comprises transmitting a differential signal SD of the first electronic device 110a by an upstream connection port 102, wherein the upstream connection port 102 comprises a configuration channel 112 configured to transmit a setting message, and the setting message is configured to indicate a connection state between the first electronic device 110a and the second electronic device 110b.

The step S2 comprises transmitting the differential signal SD by a downstream connection port 104.

The step S3 comprises receiving a control signal by a control unit 106 to determine the at least one set of upstream physical layers 114 to transmit USB data or non-USB data.

The step S4 comprises determining a transmission mode of the differential signal SD by the control unit 106 according to the setting message, wherein the transmission mode comprises a first transmission mode and a second transmission mode.

The step S5 comprises controlling the transmission mode of the differential signal SD by a hub controller 108, and the step S5 comprises steps as follows: A step S51 comprises transmitting the differential signal SD by at least one set of upstream physical layers 114 according to the transmission mode. A step S52 comprises receiving the differential signal SD by at least one set of downstream physical layers 116 according to the transmission mode. A step S53 comprises implementing the first transmission mode of the differential signal SD between the at least one set of upstream physical layers 114 and the at least one set of downstream physical layers 116 by a hub control logic 118 such that the differential signal SD is transmitted to the second electronic device 110b through the at least one set of downstream physical layers 116. A step S54 comprises transmitting the differential signal SD by a buffer 120 according to the second transmission mode.

The method with the multi-mode physical layer of the present invention shown in FIG. 6 is adapted for the universal serial bus (USB) hub device shown in FIG. 1 to FIG. 5. The universal serial bus (USB) hub device shown in FIG. 1 to FIG. 5 is also adapted for the above method, which is not described repeatedly here.

As described above, the hub device with the multi-mode physical layer of the present invention uses the multi-mode physical layer to solve the issue of signal attenuation to improve data transmission quality of the hub device.

Although the present invention has been described with preferred embodiments as above, it is not intended to limit the present invention, a person of ordinary kill in the art of the present invention can make various changes and modifications with departing from the spirit and range of the present invention. Therefore, a protection scope of the present invention should be according to a scope of attached claims of the present invention.

What is claimed is:

1. A universal serial bus (USB) hub device with a multi-mode physical layer, adapted to be electrically connected a first electronic device and a second electronic device, and the universal serial bus hub device comprising:

an upstream connection port electrically connected to the first electronic device and configured to transmit a differential signal of the first electronic device, wherein the upstream connection port comprises a configuration channel configured to transmit a setting message, the setting message is configured to indicate a connection state between the first electronic device and the second electronic device;

a downstream connection port electrically connected to the second electronic device and configured to transmit the differential signal;

a control unit electrically connected to the upstream connection port, wherein the control unit is configured to determine a transmission mode of the differential signal according to the setting message, and transmission mode comprises a first transmission mode and a second transmission mode; and a hub controller electrically connected to the upstream connection port, the downstream connection port and the control unit and configured to control the transmission mode of the differential signal, wherein the hub controller comprises:

at least one set of upstream physical layers electrically connected to the upstream connection port and configured to transmit the differential signal according to the transmission mode;

at least one set of downstream physical layers electrically connected to the downstream connection port and configured to receive the differential signal according to the transmission mode;

a hub control logic electrically connected to the at least one set of upstream physical layers and the at least one set of downstream physical layers and configured to implement the first transmission mode of the differential signal between the at least one set of upstream physical layers and the at least one set of downstream physical layers such that the differential signal is transmitted through the at least one set of downstream physical layers to the second electronic device; and a buffer electrically connected to the at least one set of upstream physical layers and the at least one set of downstream physical layers and configured to transmit the differential signal by the second transmission mode;

wherein the at least one set of upstream physical layers comprises a first set of upstream physical layers and a second set of upstream physical layers, the first set of upstream physical layers is connected to the upstream connection port through a first transceiver channel, and the second set of upstream physical layers is connected to the upstream connection port through a second transceiver channel.

2. The USB hub device with the multi-mode physical layer according to claim 1, wherein the upstream connection port and the downstream connection port are C-type connection ports compatible with a USB protocol.

3. The USB hub device with the multi-mode physical layer according to claim 1, wherein a data content corresponding to the transmission mode is USB data, non-USB data, or a combination thereof, the USB data corresponding to the first transmission mode is defined as data compatible with a USB protocol, the non-USB data corresponding to the second transmission mode is defined as data compatible with a non-USB protocol.

4. The USB hub device with the multi-mode physical layer according to claim 3, wherein the non-USB data is display port (DP) data, mobile high definition link (MHL) data, peripheral component interconnect express (PCIE) data, or a combination thereof, the DP data is defined as data compatible with a DP protocol, the MHL data is defined as data compatible with a MHL protocol, and the PCIE data is defined as data compatible with a PCIE protocol.

5. The USB hub device with the multi-mode physical layer according to claim 1, wherein the at least one set of downstream physical layers comprises a first set of downstream physical layers and a second set of downstream physical layers, the first set of downstream physical layers is connected to the downstream connection port through a third transceiver channel, and the second set of downstream physical layers is connected to the downstream connection port through a fourth transceiver channel.

6. The USB hub device with the multi-mode physical layer according to claim 5, wherein when the control unit determines the transmission mode in which the first transceiver channel transmits USB data and the second transceiver channel is not used, the hub controller controls the first set of upstream physical layers to transmit the USB data to the first set of downstream physical layers and the second set of downstream physical layers through the first transceiver channel.

7. The USB hub device with the multi-mode physical layer according to claim 5, wherein when the control unit determines the transmission mode in which the first transceiver channel is not used and the second transceiver channel transmits USB data, the hub controller controls the second set of upstream physical layers to transmit the USB data to the first set of downstream physical layers and the second set of downstream physical layers through the second transceiver channel.

8. The USB hub device with the multi-mode physical layer according to claim 5, wherein when the control unit determines the transmission mode in which the first transceiver channel transmits USB data and the second transceiver channel transmits non-USB data, the hub controller controls the first set of upstream physical layers to transmit the USB data to the first set of downstream physical layers through the first transceiver channel, and the hub controller controls the second set of upstream physical layers to transmit the non-USB data to the second set of downstream physical layers through the second transceiver channel.

9. The USB hub device with the multi-mode physical layer according to claim 5, wherein when the control unit determines the transmission mode in which the first transceiver channel transmits non-USB data and the second transceiver channel transmits USB data, the hub controller controls the first set of upstream physical layers to transmit the non-USB data to the first set of downstream physical layers through the first transceiver channel, and the hub controller controls the second set of upstream physical layers to transmit the USB data to the second set of downstream physical layers through the second transceiver channel.

10. The USB hub device with the multi-mode physical layer according to claim 5, wherein when the control unit determines the transmission mode in which the first transceiver channel transmits non-USB data and the second transceiver channel transmits non-USB data, the hub controller controls the first set of upstream physical layers to transmit the non-USB data to the first set of downstream physical layers through the first transceiver channel, and the hub controller controls the second set of upstream physical layers to transmit the non-USB data to the second set of downstream physical layers through the second transceiver channel.

11. The USB hub device with the multi-mode physical layer according to claim 1, wherein the control unit is a power delivery controller, and the power delivery controller is electrically connected to a VBUS voltage pin defined by a USB interface of the upstream connection port.

12. The USB hub device with the multi-mode physical layer according to claim 1, wherein the control unit is connected to the hub controller by a system management bus (SMBUS).

13. A method for a universal serial bus (USB) hub device with a multi-mode physical layer, wherein the universal serial bus (USB) hub device is electrically connected to a first electronic device and a second electronic device, and the method comprising steps as follows:

transmitting a differential signal of the first electronic device by an upstream connection port, the upstream connection port comprises a configuration channel configured to transmit a setting message, wherein the setting message is configured to indicate a connection state between the first electronic device and the second electronic device;

transmitting the differential signal by a downstream connection port;

determining a transmission mode of the differential signal by a control unit according to the setting message, wherein the transmission mode comprises a first transmission mode and a second transmission mode; and controlling the transmission mode of the differential signal by a hub controller, which comprises steps as follows:

transmitting the differential signal by at least one set of upstream physical layers according to the transmission mode;

receiving the differential signal by at least one set of downstream physical layers according to the transmission mode;

implementing the first transmission mode of the differential signal between the at least one set of upstream physical layers and the at least one set of downstream physical layers by a hub control logic, such that the differential signal is transmitted to the second electronic device through the at least one set of downstream physical layers; and transmitting the differential signal by a buffer according to the second transmission mode;
wherein USB data corresponding to the first transmission mode is defined as data compatible with a USB protocol, and non-USB data corresponding to the second transmission mode is defined as data compatible with a non-USB protocol.

14. The method according to claim 13, wherein the non-USB data is display port (DP) data, mobile high definition link (MHL) data, peripheral component interconnect express (PCIE) data, or a combination thereof, the DP data is defined as data compatible with a DP protocol, the MHL data is defined as data compatible with a MHL protocol, and the PCIE data is defined as data compatible with a PCIE protocol.

15. The method according to claim 13, wherein before the step of determining the transmission mode of the differential signal by the control unit according to the setting message, further comprises steps as follows:
receiving a control signal by the control unit to determine the at least one set of upstream physical layers to transmit USB data or non-USB data; and
electrically connecting the at least one set of upstream physical layers with the hub control logic when the at least one set of upstream physical layers transmits the USB data by the first transmission mode, and electrically connecting the at least one set of upstream physical layers with the buffer when the at least one set of upstream physical layers transmits the non-USB data by the second transmission mode.

16. The method according to claim 13, wherein the at least one set of upstream physical layers comprises a first set of upstream physical layers and a second set of upstream physical layers, the first set of upstream physical layers is connected to the upstream connection port by a first transceiver channel, and the second set of upstream physical layers is connected to the upstream connection port through a second transceiver channel.

17. The method according to claim 16, wherein the at least one set of downstream physical layers comprises a first set of downstream physical layers and a second set of downstream physical layers, the first set of downstream physical layers is connected to the downstream connection port through a third transceiver channel, and the second set of downstream physical layers is connected to the downstream connection port through a fourth transceiver channel.

18. The method according to claim 17, wherein when the control unit determines the transmission mode in which the first transceiver channel transmits USB data and the second transceiver channel is not used, the hub controller controls the first set of upstream physical layers to transmit the USB data to the first set of downstream physical layers and the second set of downstream physical layers through the first transceiver channel.

19. The method according to claim 17, wherein when the control unit determines the transmission mode in which the first transceiver channel is not used and the second transceiver channel transmits USB data, the hub controller controls the second set of upstream physical layers to transmit the USB data to the first set of downstream physical layers and the second set of downstream physical layers through the second transceiver channel.

20. The method according to claim 17, wherein when the control unit determines the transmission mode in which the first transceiver channel transmits USB data and the second transceiver channel transmits non-USB data, the hub controller controls the first set of upstream physical layers to transmit the USB data to the first set of downstream physical layers through the first transceiver channel, and the hub controller controls the second set of upstream physical layers to transmit the non-USB data to the second set of downstream physical layers through the second transceiver channel.

21. The method according to claim 17, wherein when the control unit determines the transmission mode in which the first transceiver channel transmits non-USB data and the second transceiver channel transmits USB data, the hub controller controls the first set of upstream physical layers to transmit the non-USB data to the first set of downstream physical layers through the first transceiver channel, and the hub controller controls the second set of upstream physical layers to transmit the USB data to the second set of downstream physical layers through the second transceiver channel.

22. The method according to claim 17, wherein when the control unit determines the transmission mode in which the first transceiver channel transmits non-USB data and the second transceiver channel transmits non-USB data, the hub controller controls the first set of upstream physical layers to transmit the non-USB data to the first set of downstream physical layers through the first transceiver channel, and the hub controller controls the second set of upstream physical layers to transmit the non-USB data to the second set of downstream physical layers through the second transceiver channel.

23. The method according to claim 13, wherein the control unit is a power delivery controller, and the power delivery controller is electrically connected to a VBUS voltage pin defined by a USB interface of the upstream connection port.

* * * * *